(12) United States Patent
Sumi et al.

(10) Patent No.: US 6,360,861 B1
(45) Date of Patent: Mar. 26, 2002

(54) CLUTCH HAVING A DAMPER SPRING

(75) Inventors: Hiromi Sumi; Norikazu Maeda, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/499,629

(22) Filed: Feb. 8, 2000

(30) Foreign Application Priority Data

Feb. 8, 1999 (JP) .............................. 11-029769

(51) Int. Cl.[7] .......................... F16F 15/12; F16D 13/00
(52) U.S. Cl. ................... 192/70.17; 192/96; 192/214.1
(58) Field of Search ............................ 192/70.17, 214, 192/214.1, 96; 464/68, 160, 161

(56) References Cited

U.S. PATENT DOCUMENTS

| 4,585,105 A | * | 4/1986 | Iio et al. .................. 192/70.17 |
| 4,906,220 A | * | 3/1990 | Worner et al. ................. 464/68 |
| 5,030,166 A | * | 7/1991 | Worner et al. ............ 464/68 X |
| 5,839,962 A | * | 11/1998 | Rohs et al. .................... 464/68 |
| 5,935,008 A | * | 8/1999 | Mizukami .................... 464/68 |

FOREIGN PATENT DOCUMENTS

| DE | 2931423 A1 | 2/1980 |
| DE | 3545857 C1 | 2/1987 |
| DE | 3628773 A1 | 3/1987 |
| DE | 3546503 A1 | 4/1987 |
| DE | 3411239 A1 | 5/1987 |
| DE | 3519912 C2 | 5/1987 |
| DE | 3642909 A1 | 6/1987 |
| DE | 3703123 A1 | 9/1987 |
| DE | 3609149 A1 | 10/1987 |
| JP | U430337 | 3/1992 |

* cited by examiner

Primary Examiner—Charles A Marmor
Assistant Examiner—Saúl Rodríguez
(74) Attorney, Agent, or Firm—Birch, Stewart, Kolasch & Birch, LLP

(57) ABSTRACT

A clutch having a friction spring for exerting a frictional torque for restraining resonance of the damper spring utilizing a small pressing force. The friction spring is disposed at a portion of the clutch member which is radially outward from the damper spring. This arrangement reduces the amount of spring force required of the friction spring. Also, the contact areas between the clutch member and the driven gear are located radially outwardly of the damper spring, which increases the annular contact area between the driven gear and the clutch member, and reduces wear.

15 Claims, 1 Drawing Sheet

CLUTCH HAVING A DAMPER SPRING

BACKGROUND OF THE INVENTION

1. Field of the invention

The present invention relates to a clutch having a damper spring in a power transmission apparatus of a vehicle. Specifically, the present invention relates to a structure for restraining resonance of the damper spring.

2. Background Art

As conventional technology, a clutch for power transmission in a motorcycle having a damper spring with a structure for restraining resonance of the damper spring is known. Such a device is disclosed in, for example, FIG. 9 of Japanese Unexamined Utility Model Publication No. 4-30337.

In the above document, the clutch having a damper spring is a multiple disk friction clutch used in a power transmission apparatus of a motorcycle having an internal combustion engine. The clutch is provided with a primary driven gear to which torque of a crankshaft of the internal combustion engine is transmitted. A clutch outer is capable of being connected to and disconnected from a main shaft of a transmission via a friction plate, and a clutch center and a plurality of damper springs are arranged between the primary driven gear and the clutch outer at intervals in a peripheral direction.

The clutch is provided with a friction spring comprising a coned disc spring for restraining resonance of the damper springs produced based on a variation in the torque of the crankshaft. The friction spring is disposed between a clutch side plate and the primary driven gear, and is positioned on an inner side of the damper springs arranged in the peripheral direction. The friction spring presses the primary driven gear in an axial direction to thereby bring the primary driven gear into contact with the clutch outer Further, slidable contact faces among the primary driven gear, the clutch outer and a cam ring are disposed on an inner side of the damper springs.

According to the above conventional multiple disk friction clutch, torque of the crankshaft transmitted to the primary driven gear is transmitted to the clutch outer via the damper springs, and is further transmitted from the friction plate to the main shaft via the clutch center in connecting the clutch. The damper spring can be elongated and contracted between the primary driven gear and the clutch outer and, accordingly, a damping function prevents an abrupt torque change produced in connecting the clutch or the like from being transmitted to the clutch outer.

The torque variation of the crankshaft results in elongation and contraction of the damper spring, and when a frequency of the torque variation coincides with natural frequency of the damper spring, the damper spring is resonated. However, frictional torque by frictional force produced on the slidable contact faces, based on press force of the friction spring, is operated to hinder the primary driven gear from rotating relative to the clutch outer. The resonance is therefore restrained.

In order to restrain the resonance of the damper spring in this way, a frictional torque is required which has a magnitude determined by frictional force produced on the slidable contact faces, and a distance from an axis line of the main shaft. The axis line of the main shaft is a rotational center line of the primary driven gear to an operational point of the frictional force.

When the slidable contact faces are disposed on an inner side of the damper spring as in conventional devices, the distance from the axis line of the main shaft to the slidable contact faces is comparatively short and, accordingly, in order to provide the required frictional torque magnitude, the frictional force produced on the slidable contact faces must increase by increasing the press force by the spring force of the friction spring.

Disadvantageously, when the press force is increased, the large press force operates on the slidable contact faces of the primary driven gear and the clutch outer and, accordingly, in order to minimize wear caused by the press force at the slidable contact faces of the both members, a wear resistant surface treatment is required on both of the members. This treatment adds to the difficulty and cost of manufacture.

SUMMARY OF THE INVENTION

The present invention is in part addressed to overcoming the disadvantages of the conventional art. The present invention includes a clutch having a damper spring in which frictional torque for restraining resonance of a damper spring can be provided by small press force by a frictional spring. The clutch member is capable of being connected to and disconnected from a driven gear and a driven shaft.

A driven gear and driven shaft are transmitted a torque of a drive shaft. The driven gear is arranged coaxially and rotatably to the drive shaft, and a plurality of damper springs are relatively rotatable between the driven gear and the clutch member by being elongated and contracted.

A friction spring is arranged between the driven gear and the clutch member, and transmits the torque of the driven gear to the clutch member The friction spring is arranged at intervals along a periphery, and presses the driven gear in an axial direction to thereby bring the driven gear into contact with the clutch member or a member integrated to the clutch member.

The contact restrains resonance of the damper springs by a frictional force produced on slidable contact faces of the members, the friction spring and the slidable contact faces are disposed on an outer side of the damper springs.

The friction spring is disposed on the outer side of the damper springs arranged along the peripheral direction, and presses the driven gear to the clutch member or the member integrated to the clutch member in the axial direction. This pressing brings both members into contact with each other. The slidable contact faces formed by the contact are disposed on the outer side of the damper springs and therefore, the slidable contact faces producing the frictional force are disposed on the outer side of the damper springs, and are disposed at positions at which distances from the axis line of the driven shaft are larger than those of the slidable contact faces according to the conventional technology, in which the contact faces are disposed on the inner side of the damper springs.

As a result of the above configuration, the frictional force for providing required frictional torque for restraining resonance of the damper spring may be smaller than that in the conventional technology. Therefore, the spring force by the friction spring may be small.

Further, the press force of the driven gear exerted on the clutch member or the member integrated to the clutch member at the slidable contact faces becomes small. Accordingly, wear at the slidable contact faces is minimized and durability increased. Further, since wear is minimized, there is no need for a wear resistant surface treatment on the slidable contact faces. This reduces difficulty and cost of manufacture.

Because the slidable contact faces are disposed on the outer side of the damper springs, an area of the slidable contact faces can be made larger than an area of conventional slidable contact faces. Therefore, without enlarging a diameter of the driven gear and a diameter of the clutch member or the member integrated to the clutch member, pressure based on the press force of the driven gear exerted on the clutch member can be reduced. This reduces wear at the slidable contact faces.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
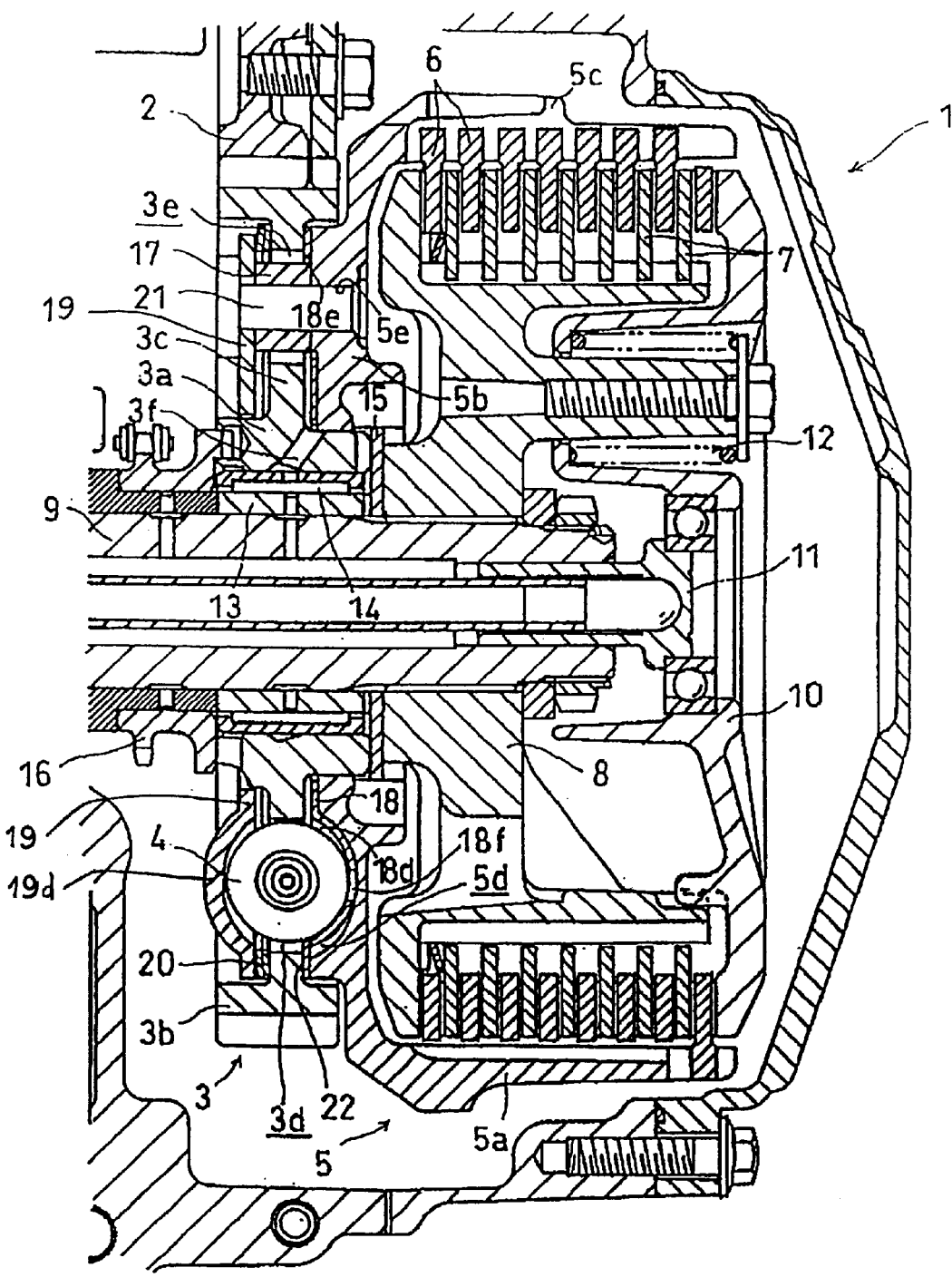
FIG. 1 is a sectional view of a multiple disk friction clutch having a damper spring according to the present invention.

FIG. 1 is a sectional view of a multiple disk friction clutch 1 to which a clutch having a damper spring according to the present invention is applied. The multiple disk friction clutch 1 is integrated to a power transmission apparatus of a motorcycle mounted with a V-type two cylinder overhead camshaft internal combustion engine. Torque of a crankshaft of the internal combustion engine is transmitted to a rear wheel via the multiple disk friction clutch 1, a normally mesh type speed change gear and a drive chain.

The multiple disk friction clutch 1 includes elements common with conventional multiple disk friction clutches. A primary driven gear 3 having a driven gear in mesh with a primary drive gear 2 is fitted by a spline to a crankshaft of an internal combustion engine. The engine drive shaft is coaxially and rotatably supported by a main shaft 9 of the speed change gear having a driven shaft.

A clutch outer 5 is a bottomed cylinder having a clutch member connected to the primary driven gear 3 via damper springs 4 coaxially and rotatably to the main shaft 9. A clutch center 8 is fitted by a spline to the main shaft 9 and is rotated integrally with the main shaft 9. A plurality of clutch disks 6 are provided with, at their outer peripheries, claws inserted into a plurality of notches 5c extending in the axial direction. The notches are formed at intervals on the periphery of clutch outer 5, at cylindrical portion 5a.

A plurality of clutch plates 7 are fitted by a spline to an outer periphery of the clutch center 8 and are slidable in the axial direction. The clutch plates alternately overlap the clutch disks 6. The clutch disks 6 and the clutch plates 7 respectively form friction plates.

A pressure plate 10 is arranged coaxially in a hollow portion formed in the main shaft 9 and is pivotably attached to a front end portion of a lifter rod 11. The pressure plates are movably mounted in the axial direction under the influence of hydraulic pressure. The pressure plate 10 normally presses the clutch disks 6 and the clutch plates 7 by spring force of a clutch spring 12, and the clutch 1 is brought into a connected state by friction among the clutch disks 6 and the clutch plates 7 in this state The clutch plates 7 are moved in the axial direction along with the lifter rod 11 by hydraulic pressure against the spring force of the clutch spring 12, and the spring force of the clutch spring 12 exerted to the clutch disks 6 and the clutch plates 7 is released to thereby form clearances therebetween and to bring the clutch 1 into a disconnected state.

The mode of transmitting torque of the crankshaft according to such a multiple disk friction clutch 1 is as follows.

The torque of the crankshaft transmitted from the primary drive gear 2 to the primary driven gear 3 is transmitted to the clutch outer 5 via the damper springs 4. When the clutch 1 is brought into the connected state, the torque of the clutch outer 5 is transmitted to the clutch center 8 via the clutch disks 6 and the clutch plates 7 having the friction plates and is further transmitted to the main shaft 9. When the clutch 1 is brought into the disconnected state, there are clearances among the clutch disks 6 and the clutch plates 7 and accordingly, transmission of the torque is cut off at the portions, In this way, the clutch outer 5 can be connected to and disconnected from the main shaft 9. The damper springs 4 can be elongated and contracted between the primary driven gear 3 and the clutch outer 5 and accordingly, abrupt torque change caused in connecting the clutch 1 in the disconnected state or the like is not transmitted to the clutch outer 5.

Next, a detailed description will be given of the primary driven gear 3 and the clutch outer 5 of the multiple disk friction clutch 1.

A cylindrical clutch outer guide 13 is fitted to the outer periphery of the main shaft 9. The primary driven gear 3 is provided with a boss portion 3a fitted to the outer periphery of an outer race of a needle bearing 14, which is mounted to the outer periphery of the clutch outer guide 13. A gear portion 3b is formed with teeth in mesh with teeth of the primary drive gear 2, and a flat plate portion 3c is formed between the boss portion 3a and the gear portion 3b. An end face of the boss portion 3a on a side of the clutch outer 5 is brought into contact with a thrust washer 15, which is in turn brought into contact with an end face of the clutch center 8. An end face of the boss portion 3a on a side of the main shaft 9 for mounting the transmission is brought into contact with a drive sprocket 16 for driving an accessory. The accessory is rotated integrally with the primary driven gear 3 via an engaging portion engaging with the boss portion 3a to thereby prevent the primary driven gear 3 from moving in the axial direction.

In the flat plate portion 3c, there are respectively formed six pieces of first through holes 3d substantially in a rectangular shape, and three pieces of second through holes 3e in an elliptical shape on a circumference having a center line by the axis line of the main shaft 9 at intervals in the peripheral direction. These first and second through holes 3d and 3e are arrayed in the peripheral direction to establish a relationship in which two pieces of the first through holes 3d are provided between two pieces of the second through holes 3e.

The respective first through hole 3d is inserted with the damper spring 4 comprising a helical spring in a contracted state, such that both end portions of the damper spring 4 press both end portions of the first through hole 3d via spring receivers. The respective second through hole 3e is penetrated with a sleeve 17 in a cylindrical shape inserted with a rivet 21 The diameter of the second through hole 3e is larger than the outer diameter of the sleeve 17, and a clearance in the peripheral direction is formed therebetween. Therefore, the primary driven gear 3 and the clutch outer 5 can be driven relative to each other within the range of the clearance.

The clutch outer 5 is provided with the cylindrical portion 5a and a side wall portion 5b on the side of the primary driven gear 3. The outer periphery of the boss portion 3a of the primary driven gear 3 is fitted into a through hole formed at the central portion of the side wall portion 5b, and accordingly, the clutch outer 5 is rotatably centered on the axis line of the main shaft 9, along with the primary driven gear 3.

Six recess portions 5d for containing the damper springs 4 are formed on a primary driven gear 3 side of the side wall portion 5b at intervals in a peripheral direction in correspondence with the first through holes 3d of the primary driven gear 3. The side wall portion 5b is formed with three rivet holes 5e for the rivets 21 penetrating the second through holes 3e of the primary driven gear 3 at intervals in the peripheral direction in correspondence with the second through holes 3e.

The primary driven gear 3 side of the clutch outer 5 has an annular clutch outer side plate 18 corresponding to a size of a side face of the flat plate portion 3c of the primary driven gear 3, The clutch outer side plate 18 is formed with six recess portions 18d in correspondence with the recess portions 5d of the side wall portion 5b of the clutch outer 5 for containing the damper springs 4, and is formed with three through holes 18e. The through holes are sized to penetrate the sleeves 17 in correspondence with the rivet holes 5e of the side wall portions 5b.

The recess portion 18d is fabricated by cutting a metal sheet in an H-shape and bending the cut portion in a shape substantially complying with the outer periphery of the damper spring 4. The recess portion is cut in correspondence with the diameter and the length of the damper spring 4. Element 18f indicates an opening produced by fabricating a side portion of the cut portion 12 to comply with the axial direction of the damper spring 4 into the bent shape. The clutch outer side plate 18 can have the relevant frictional coefficient and wear resistance which may differ from a material of the clutch outer 5.

The clutch outer side plate 18 is mounted to the side wall portion 5b such that recess portions 18d are fitted to the recess portions 5d of the clutch outer 5. The through holes 18e are disposed concentrically with the rivet holes 5e and the outer periphery of the boss portion 3a is fitted into the center hole. Accordingly, the clutch outer side plate 18 integrally rotates with the clutch outer 5, and corresponds to a member integrated to the clutch outer 5.

The boss portion 3a is formed with an oil hole 3f for supplying a lubricant not only to a portion of fitting together the boss portion 3a and the side wall portion 5b, but also respective contact portions of the primary driven gear 3, the clutch outer 5, and the clutch outer side plate 18 to communicate with an oil hole provided to the outer race of the needle bearing 14. Lubricant is supplied to portions of the clutch outer 5 and the clutch outer side plate 18 in contact with each other via the openings 18f formed at the bottom portions of the recess portions 18d of the clutch outer side plate 18.

A side of the flat plate portion 3c of the primary driven gear 3 is opposed to a side thereof where the clutch outer 5 is disposed, and is arranged with an annular clutch side plate 19 in correspondence with the size of the side face of the flat plate portion 3c of the primary driven gear 3. This holds the damper springs 4 with stability.

The boss portion 3a of the primary driven gear 3 is fitted into a central hole of the clutch side plate 19. The clutch side plate 19 is respectively formed with six recess portions 19d for containing the damper springs 4 in correspondence with the first through holes 3d of the primary driven gear 3, and three rivet holes 19e in correspondence with the rivet holes 5e of the side wall portion 5b of the clutch outer 5 at intervals in the peripheral direction.

A friction spring 20 includes a coned disc spring between the clutch side plate 19 and the flat plate portion 3c of the primary driven gear 3. The friction spring 20 is disposed on an outer side of the damper springs 4 arranged in the peripheral direction.

When the clutch outer 5 and the clutch side plate 19 are fixedly attached by the rivets 21 and the sleeves 17 into which the rivets 21 are inserted, the friction spring 20 is pressed by a peripheral face near an outer peripheral edge of the clutch side plate 19. In this case, a spring force of the friction spring 20 is exerted to press the primary driven gear 3 in the axial direction toward the side wall portion 5b of the clutch outer 5. Because the clutch outer 5 and the clutch side plate 19 are integrated by rivets 21, the clutch side plate 19 is integrally rotated with the clutch outer 5, and corresponds to a member integrated with the clutch outer 5.

By the spring force of the friction spring 20, the flat plate portion 3c of the primary driven gear 3 is pressed to the clutch outer side plate 18 mounted on the clutch outer 5. Both members are brought into contact with each other at a position on the outer side of the-damper springs 4, and, at a position opposed to a position of the flat plate portion 3c attached with the friction spring 20 and an annular slidable contact face 22 is formed at the contact portion. Accordingly, when the primary driven gear 3 and the clutch outer 5 are rotated relative to each other within a range of the clearances in the peripheral direction formed between peripheral edges of the second through holes 3e and outer peripheries of the sleeves 17, frictional force in correspondence with the press force based on the spring force of the friction spring 20 is produced on the slidable contact face 22 and frictional torque for hindering the relative rotation is produced.

The frictional force is set by experiment and is required to restrain resonance of the damper springs 4. When the required frictional torque stays the same as that in the conventional technology, according to the embodiment, the slidable contact face 22 producing the frictional force is disposed on the outer side of the damper springs 4, and is disposed at a position having a distance from the axis line of the main shaft 9 which is larger than that of the slidable contact face according to the conventional technology.

In the conventional technology, the slidable contact face is disposed on the inner side of the damper springs 4 (the frictional coefficient of the slidable contact face of the conventional technology is set to be equal to that of the embodiment). Accordingly, the frictional force for providing the required frictional torque may be smaller than that in the conventional technology. The spring force by the friction spring 20 may therefore be smaller. The pressing force of the primary driven gear 3 to the clutch outer side plate 18 at the slidable contact face 22 in turn becomes smaller. This reduces wear at the slidable contact face 22.

The annular slidable contact face 22 is disposed on the outer side of the damper springs 4, and accordingly, the area of the slidable contact face 22 can be made larger than the area of the slidable contact face according to the conventional technology. As a result, pressure based on the press force of the primary driven gear 3 exerted to the clutch outer side plate 18 can be reduced and wear at the slidable contact face 22 is further reduced.

The spring force can be adjusted by adjusting the spring force of the friction spring 20 or adjusting the frictional coefficient of the slidable contact face 22. Alternatively, the spring force of the friction spring 20 can be adjusted by adjusting the spring constant of the spring or adjusting the length of the sleeve 17. The frictional coefficient of the slidable contact face 22 can be adjusted by changing the material of the primary driven gear 3 or the clutch outer side plate 18. The frictional coefficient may also be changed by changing the degree of lubrication, surface treatments, or the like.

In rotating the primary driven gear 3 and the clutch outer 5 relative to each other, the frictional spring 20 is rotated along with the primary driven gear 3 in view of the frictional coefficient between the primary driven gear 3 and the clutch side plate 19. As a result, frictional force is produced at portions of the friction spring 20 and the clutch side plate 19 in contact with each other, and a frictional torque is produced by the frictional force. However, the frictional coefficient at the contact portion is made to be smaller than the frictional coefficient at the slidable contact face 22. Therefore, the main portion of the frictional torque for restraining resonance of the damper springs 4 is shared by the frictional torque produced by the frictional force at the slidable contact face 22. The resonance restraining operation depends on the frictional torque produced by the frictional force at the slidable contact face 22.

An explanation follows of the operation of restraining resonance of the damper springs 4 by the frictional spring 20 in the multiple disk frictional clutch 1

When a frequency of a variation in torque caused in the crankshaft coincides with the natural frequency of the damper springs 4, the damper springs 4 resonate. The primary driven gear 3 will then rotate significantly relative to the clutch outer 5 within the range of the clearances in the peripheral direction formed between the peripheral edges of the second through holes 3e and the outer peripheries of the sleeves 17. At this time, the frictional force in accordance with the press force based on the spring force of the friction spring 20 is produced at the slidable contact face 22. Further, the frictional torque produced by the frictional force hinders the primary driven gear 3 in rotating relative to the clutch outer 5. Accordingly, the resonance of the damper spring 4 is restrained.

The above-described embodiment achieves the following effects.

The friction springs 20 disposed on the outer, side of the damper springs 4 arranged in The peripheral direction, presses the primary driven gear 3 to the outer side plate in the axial direction to thereby bring the both members into contact with each other. The annular slidable contact face 22 formed by the contact is disposed on the outer side of the damper springs 4 and accordingly, the slidable contact face 22 producing the frictional force is disposed on the outer side of the damper springs 4 and is disposed at a position at which the distance from the axis line of the main shaft 9 is larger than that of the slidable contact face according to the conventional technology. Therefore, the frictional force for providing the required frictional torque for restraining the resonance of the damper springs 4, may be smaller than that of the conventional technology. The spring force by the frictional spring 20 may thus be smaller. The press force of the primary driven gear 3 exerted on the clutch outer side plate 18 at the slidable contact face 22 also becomes smaller.

This reduces wear at the slidable contact face. Further, since wear is reduced, there is no need for wear resistant surface treatment on the slidable contact face. Difficulty and cost of manufacture are reduced.

By the spring force of the friction spring 20, on the outer side of the damper springs 4, the primary driven gear 3 and the clutch outer 5 are integrated in a state in which the both members press against each other via the clutch outer side plate 18 and accordingly, the damper springs 4 can stably be held and operation of the damper springs 4 is stabilized.

By installing the clutch outer side plate 18 mounted to the clutch outer 5, wear of the clutch outer 5 caused by the contact with the damper springs 4 can be prevented, and wear of the clutch outer 5 at the slidable contact face 22 caused by being pressed by the primary driven gear 3 can be prevented. Further, in consideration of the fact that the clutch outer side late 18 forms the slidable contact face 22 along with the primary driven gear 3, the material of the clutch outer side plate 18 can be different from the material forming the clutch outer 5.

Although according to the above-described embodiment, the clutch outer side plate 18 is installed, the plate can also be dispensed with.

Although according to the embodiment, the friction spring 20 is provided between the clutch side plate 19 and the primary driven gear 3, the friction spring 20 may be provided between the clutch outer side plate 18 and the primary driven gear 3 to thereby press the primary driven gear 3 toward the clutch side plate 19. Also in this case, the clutch outer side plate 18 can be dispensed with and in that case, the friction spring 20 is provided between the clutch outer 5 and the primary driven gear 3.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A clutch comprising:
   a clutch member, the clutch member being selectively engageable with a driven gear and a driven shaft, and being rotatable about the axis of the driven shaft;
   at least one damper spring disposed between the driven gear and the clutch member, the at least one damper spring permitting relative rotation between the clutch member and the driven gear; and
   a friction spring, the friction spring exerting a spring force on the driven gear to urge the driven gear into contact with the clutch member, the friction spring having a restraining resonance in the at least one damper spring due to the frictional force between a contact face of the driven gear and a contact face of the clutch member, the contact faces of the driven gear and of the clutch member are located radially outwardly from the at least one damper spring in relation to the driven shaft, wherein
   the friction spring is located radially outward from the at least one damper spring in relation to the driven shaft.

2. The clutch of claim 1, wherein the contact faces include annular surfaces.

3. The clutch of claim 1, wherein each of the at least one damper springs extends through a respective through hole in the driven gear, with respective end portions of a damper spring pressing against ends of its respective through hole.

4. The clutch of claim 1, wherein the clutch member includes a clutch side plate and a clutch outer side plate, the driven gear being disposed at least partially between the clutch side plate and the clutch outer side plate.

5. The clutch of claim 4, wherein the friction spring is disposed between the clutch side plate and the driven gear.

6. The clutch of claim 4, wherein the clutch member includes a clutch center, the clutch center being rotatable with the driven shaft by a spline connection.

7. The clutch of claim 6, wherein the clutch member includes:

a plurality of clutch plates mounted at a distal radial location on the clutch center, the clutch plates being engageable with clutch disks supported on a clutch outer, the clutch outer having a bottomed cylindrical shape and being mounted concentrically with the driven shaft;

a pressure plate, the pressure plate being partially disposed within a recess portion of the clutch center; and a clutch spring, the clutch spring being compressed between a portion of the pressure plate and the clutch center.

8. The clutch of claim 7, wherein a peripheral annular edge of the pressure plate is engageable with the plurality of clutch plates to selectively engage the clutch plates with the clutch disks.

9. The clutch of claim 1, wherein the clutch member includes:

a clutch center integrally rotatable and concentrically mounted with the driven shaft, the clutch center supporting a plurality of clutch plates; and a clutch outer, the clutch outer being adjacent to the damper springs and supporting a plurality of clutch disks, wherein the clutch outer and the clutch center are relatively axially movable to selectively engage the clutch disks with the clutch plates.

10. The clutch of claim 9, wherein the clutch member includes a clutch side plate, the driven gear being at least partially disposed between the clutch side plate and the clutch outer.

11. The clutch of claim 10, wherein the friction spring exerts a force between the clutch side plate and the driven gear to urge the contact faces into engagement.

12. The clutch of claim 10, wherein the at least one damper spring is disposed within at least one through hole of the driven gear.

13. The clutch of claim 12, wherein the clutch side plate includes a recess portion which houses a portion of the at least one damper spring.

14. The clutch of claim 11, wherein:

the clutch outer includes a recess portion which houses a portion of the at least one damper spring; and the contact face of the clutch member includes an annular surface of the clutch outer.

15. The clutch of claim 9 wherein the at least one damper spring selectively transmits a torque of the driven gear to the clutch member.

* * * * *